United States Patent [19]

Abolins et al.

[11] 4,456,720

[45] Jun. 26, 1984

[54] FLAME RESISTANT NON-DISCOLORED POLYPHENYLENE ETHER RESIN COMPOSITIONS

[75] Inventors: Visvaldis Abolins, Delmar; Fred F. Holub, Schenectady, both of N.Y.

[73] Assignee: General Electric Company, Pittsfield, Mass.

[21] Appl. No.: 527,283

[22] Filed: Aug. 29, 1983

Related U.S. Application Data

[63] Continuation of Ser. No. 342,355, Jan. 25, 1982, abandoned.

[51] Int. Cl.$^3$ .................... C08K 5/56; C08K 5/55
[52] U.S. Cl. .................... 524/176; 524/183; 524/373; 524/469
[58] Field of Search ............... 524/176, 183, 373, 469

[56] References Cited

U.S. PATENT DOCUMENTS

| | | | |
|---|---|---|---|
| 3,453,231 | 7/1969 | Bussink et al. | 524/183 |
| 3,974,235 | 8/1976 | Cooper et al. | 524/141 |
| 4,016,138 | 4/1977 | Anderson | 524/373 |
| 4,144,288 | 3/1979 | Miano | 524/176 |
| 4,206,154 | 6/1980 | Lee et al. | 524/176 |

Primary Examiner—V. P. Hoke
Attorney, Agent, or Firm—Hedman, Gibson, Costigan & Hoare

[57] ABSTRACT

There is provided a novel flame retardant system or additive which when incorporated in a polymer, such as polyphenylene ether resin compositons, produces novel flame resistant non-discolored polyphenylene ether resin compositions. The flame retardant system comprises a composition of stable halogenated organic compounds and boron containing salts or esters which are stable at 250°–300° C.

22 Claims, No Drawings

FLAME RESISTANT NON-DISCOLORED POLYPHENYLENE ETHER RESIN COMPOSITIONS

CROSS-REFERENCE TO RELATED APPLICATION

This is a continuation of copending application Ser. No. 342,355, filed Jan. 25, 1982, now abandoned.

STATEMENT OF THE INVENTION

This invention relates to a novel flame retardant system or additive which inhibits discoloration of polymers, particularly compositions comprising polyphenylene ether resins, also known as polyphenylene oxides (PPO) resins, when such resins have incorporated therein the flame retardant system. The invention also relates to flame resistant compositions comprising polyphenylene ether resins and a small but effective amount of the said flame retardant system. Such flame resistant polyphenylene ether resin compositions do not discolor on molding.

The flame retardant system in its broad aspects, comprises a combination or admixture of a stable halogenated organic compound and a boron containing salt or ester which are stable at 250°-300° C. A preferred embodiment of such a flame retardant system comprises about 5 parts to about 35 parts by weight of the halogenated, organic compound in admixture with about 1 to about 3 parts by weight of the boron containing salt or ester, the preferred components being hexabromobiphenyl, as the halogenated organic compound and zinc borate as the boron containing compound. A preferred flame resistant polyphenylene ether resin composition comprises a blend made by incorporating an effective amount of the aforesaid flame retardant system into a composition comprising a poly(2,6-dialkyl-1,4-phenylene) ether resin, as for example, poly(2,6-dimethyl-1,4-phenylene) ether resin. The amount of the halogenated organic compound and the boron containing salt or ester taken together and forming the flame retardant system or additive, which is added to the polyphenylene ether resin composition, can range from about 10 parts to about 25 parts by weight of the flame retardant system per 100 parts by weight of the polyphenylene ether resin composition.

The invention also includes methods for preparing the flame retardant system, for preparing polyphenylene ether resin compositions flame resisted with said system, for molding flame resistant polyphenylene ether resin compositions, and also includes the flame resistant non-discolored molded products obtained therefrom. The compositions after processing are not only flame resistant but also do not discolor on molding.

BACKGROUND OF THE INVENTION

The polyphenylene ethers are known and described in numerous publications including U.S. Pat. Nos. 3,306,874 and 3,306,875 of Hay, and U.S. Pat. Nos. 3,257,357 and 3,257,358 of Stamatoff, all incorporated herein by reference. The high molecular weight polyphenylene ethers are high performance engineering thermoplastics possessing relatively high melt viscosities and softening points, that is, in excess of 250° C., and are useful for many commercial applications requiring high temperature resistance including formation of film, fiber and molded articles.

Cizek, U.S. Pat. No. 3,383,435, which is incorporated herein by reference discloses polyphenylene ether-styrene resin compositions, including rubber-modified styrene resin-polyphenylene ether resins wherein the rubber component is of the unsaturated type such as polymers and copolymers of butadiene. The styrene resin component improves the moldability of the polyphenylene ethers.

In Cooper et al U.S. Pat. Nos. 3,943,191, 3,959,211, 3,974,235, 4,101,503, 4,101,504, 4,101,505, 4,102,850 and 4,226,761 there are disclosed various polyphenylene ether resin compositions which include a flame retardant additive. The aforesaid patents are incorporated herein by reference.

DESCRIPTION OF THE INVENTION

It has now been found that polyphenylene ether compositions can be rendered flame resistant without becoming discolored upon molding. This is accomplished by a flame retardant system or additive which includes a combination or admixture of a stable halogenated organic compound and boron containing salts or esters which are stable at 250°-300° C. When an effective amount of this system is incorporated in the polyphenylene ether composition, the resulting composition is rendered flame resistant and at the same time does not discolor upon molding.

Examples of the stable halogenated organic compounds are substituted benzene such as tetrabromobenzene, hexachlorobenzene, hexabromobenzene, and biphenyls such as 2,2'-dichlorodiphenyl, 2,4'-dibromodiphenyl, 2,4'-dichlorobiphenyl, hexabromobiphenyl, octabromobiphenyl, decabromobiphenyl, and halogenated diphenyl ethers containing from 2 to 10 halogen atoms as for example decabromodiphenyl ether. Also a brominated-phenoxy alkane can be employed such as 1,2bis(tribromophenoxy)ethane.

Examples of boron containing salts or esters are: zinc borate, barium metaborate and tri(2-phenylcyclohexyl) borate.

In preparing the flame retardant system, in general, about 1 to about 3 parts by weight of the boron containing salt or ester and about 5 to about 35 parts by weight of the halogenated organic compound are mixed together. To render the polyphenylene ether composition flame resistant from about 10 to about 25 parts by weight of the total flame retardant system is incorporated per 100 parts of the polyphenylene ether resin composition which can also contain polybutadiene-modified polystyrene which is available from Foster Grant under the designation FG-834. Polyphenylene ethers are also available commercially as a blend with styrene resin. See U.S. Pat. No. 3,383,435 and U.S. Pat. No. 3,663,654. These blends comprise between about 25 and 75% of polystyrene units and are available from General Electric Company under the trademark NORYL®.

At high temperatures, 400°-600° C., at which burning of the polyphenylene ether resin composition occurs, the halogenated compound and the boron containing salt or ester interact to form intermediates which produce char and quickly quench the flame, thus maintaining excellent processing color. Small, but effective amounts of catalyst such as ferrocene and polyferrocene, which at low level, can be added to enhance flame quenching.

These catalysts can be added in the amounts ranging from about 0.5 parts to about 3 parts by weight per 100 parts by weight of the polyphenylene ether resin composition.

The polyphenylene ethers contemplated by the subject invention, in a preferred embodiment, have repeated structural units of the formula:

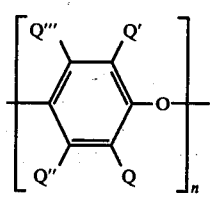

where Q, Q', Q" and Q''' are independently selected from the group consisting of hydrogen, hydrocarbon radicals, halohydrocarbon radicals having at least two carbon atoms between the halogen atom and phenyl nucleus and Q', Q" and Q''' in addition may be halogen with the proviso that Q and Q' are preferably free of tertiary carbon atom; and n represents the total number of monomer residues and is an integer of at least 50. Examples of polyphenylene ethers corresponding to the above formula can be found in the above-referenced patents of Hay and Stamatoff.

The term polyphenylene ether, as used in this disclosure, is intended to include within its scope those polymers represented by the above formula as well as polyphenylene ethers having properties altered by admixture with other resins. In the U.S. Pat. No. 3,383,435, there is provided means for simultaneously improving the melt upgrading many properties of polystyrene. The invention of U.S. Pat. No. 3,383,435 is based upon the discovery that the polyphenylene ethers and the polystyrenes, including the modified polystyrenes, are combinable in all proportions resulting in blends having many properties improved over those of either of the components. As disclosed in said patent, the polystyrenes combinable with the polyphenylene ether are those having at least 25 percent by weight polymer units derived from a monomer having the formula:

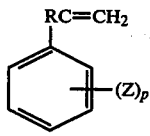

wherein R is hydrogen, (lower)alkyl or halogen; Z is a member selected from the class consisting of vinyl, hydrogen, halogen and (lower)alkyl; and p is 0 or a whole number equal to from 1 to 5. The preferred composition of this patent is a poly(2,6-dialkyl-1,4-phenylene) ether combined with polystyrene or rubber-modified polystyrenes. "(Lower)alkyl" includes 1-6 carbon atoms.

The process for preparing the flame resistant polyphenylene ether compositions, in general, involves intimately mixing the flame retardant system with the polyphenylene ether composition, then blending the components. Preferably, the polyphenylene ether and the combination of the halogenated, organic compound and boron containing salt or ester are first intimately mixed to form a premix, and the premix is passed through a compounder extruder at an elevated temperature of about 500° F. to about 600° F. The extruded blend is pelletized and can then be molded into any desired shape, as, for example, by injecting molding, such as, in a Newbury injection molding machine.

The flame resistant compositions of this invention are useful for all purposes for which polyphenylene ethers have hitherto been used, for example, for conversion to films, fibers, molded articles and the like.

The flame retardant system is used advantageously with polyphenylene ethers per se or in compositions thereof with other additives, such as polystyrene and rubber modified polystyrene, and particularly where the processing or application of such compositions requires the use of high temperatures which would result in discoloration and where impact strength might be reduced.

The present kinds of compositions can also contain non-resinous supplementary ingredients heretofore customarily employed in polyphenylene ether molding compositions to improve certain other chemical and physical properties. The non-resinous supplements include fillers and/or reinforcing agents, such as, mineral fillers (for example, clay, talc, calcium sulfate, etc.), strengthening fibers (for example, glass fibers, graphite whiskers, etc.), antioxidants, dyes, pigments, plasticizers, and so forth. These are generally added in minor but effective amounts ranging from 1% to 50% by weight, based on the total composition weight.

DESCRIPTION OF THE PREFERRED EMBODIMENTS

The following examples illustrate the invention further, and are not to be construed as limiting the invention.

EXAMPLES 1 AND 2

The composition of the flame retardant system and of the blends of the polyphenylene ether with the flame retardant system, and the properties of the flame resistant polyphenylene ether compositions are summarized in Table I below.

In the Table, PPO means poly(2-6-dimethyl-1,4-phenylene) oxide or ether having an intrinsic viscosity of about 0.5 dl./g. measured in chloroform at 30° C. and a high impact polybutadiene modified polystyrene. UL Subject 94 and SEI and SE II refer to the flame resistant tests and standards of Underwriter's Laboratories Bulletin No. 94, SE being the abbreviation for "self extinguishing" and the Roman numerals indicate the UL ratings.

The PPO and the polystyrene were premixed and then there was mixed therewith the flame retardant system of hexabromobiphenyl and tri(2phenylcyclohexyl) borate. The blends were compounded and extruded in a compounder extruder at a temperature of 450° F. The extruded pellets were molded at a temperature of 550° F. into standard test pieces in an injection molding machine.

Example A is a comparison example wherein only the well known flame retardant hexabromobiphenyl is employed.

TABLE I

|  | EXAMPLES | | |
| --- | --- | --- | --- |
|  | A | 1 | 2 |
| PPO ® | 35 | 35 | 35 |
| High Impact Polystyrene | 65 | 65 | 65 |
| Hexabromobiphenyl | 15.2 | 15.2 | 15.2 |
| Tri(2-phenylcyclohexyl)borate | 0.0 | 1.0 | 3.0 |
| Properties |  |  |  |

TABLE I-continued

| | EXAMPLES | | |
|---|---|---|---|
| | A | 1 | 2 |
| UL Subject 94 1/16" seconds | FAILS Burns | SE II | SE I |
| Heat Distortion °F./264 psi 2" Span. | 212–215 | 206–309 | 206–206 |
| Color | — | natural | natural |
| Izod Impact (ft.lb./in. notch) | 3.2 | 5.1 | 4.8 |

EXAMPLES 3, 4, 5

The composition of the flame retardant system and of the blends of polyphenylene ether with the flame retardant system, and the properties of the flame resistant polyphenylene ether compositions are summarized in Table II below. The procedure is the same as in Example 1 and 2, except that zinc borate and barium metaborate are substituted for the tri(2-phenylcyclohexyl) borate.

TABLE II

| | EXAMPLES | | |
|---|---|---|---|
| | 3 | 4 | 5 |
| PPO ® | 35 | 35 | 35 |
| High Impact Polystyrene | 65 | 65 | 65 |
| Hexabromo biphenyl | 15.2 | 15.2 | 15.2 |
| Zinc borate | 3.0 | 1.0 | — |
| Barium metaborate | — | — | 3.0 |
| Properties | | | |
| UL Subject 94 Test | SE1 | SE1 | SE1 |
| Heat Distortion, °F., 264 psi 2" span | 218 | 214 | 217 |
| Color | natural | natural | natural |
| Izod Impact, notched | 2.8 | 3.3 | 2.6 |
| Tensile Yield | 9000 | 9100 | 8800 |
| Tensile Ult. | 7800 | 7800 | 7400 |
| Elongation, % | 36 | 34 | 30 |

EXAMPLE 6

The composition of the flame retardant system and of the blends of polyphenylene ether with the flame retardant system and the properties of the flame resistant polyphenylene ether composition are summarized in Table III below. The procedure is the same as in Examples 1 and 2 except that the bromo compound, 1,2-bis(-tribromophenoxy)ethane is used instead of hexabromobiphenyl, and ferrocene is added as a coagent to enhance flame quenching.

TABLE III

| | Example 6 |
|---|---|
| PPO ® | 25 |
| High Impact Polystyrene | 75 |
| 1,2bis(tribromophenoxy)ethane | 15.2 |
| Tri(2-phenylcyclohexyl)borate | 3.0 |
| Ferrocene | 0.7 |
| Properties | |
| UL Subject 94 Test | SE1 |
| Heat Distortion °F./264 psi 2" span | 195 |
| Color | natural very light |
| Izod Impact notched | 2.8 |
| Tensile Yield | 6600 |
| Tensile Ult. | 6100 |
| Elongation % | 53 |

It will be evident from the above that the flame retardant system according to this invention is highly effective in rendering polyphenylene ether compositions flame resistant, and that the polyphenylene ether compositions rendered flame resistant thereby are non-discolored. At the same time other properties of the flame resistant compositions are not adversely affected by the flame retardant system and in some cases improved, such as impact strength.

The above mentioned patents and/or patent applications are incorporated herein by reference. Obviously, other modifications and variations of the present invention are possible in light of the above teachings. For instance, instead of poly(2,6-dimethyl-1,4-phenyl ether), a copolymer such as poly(2,6-dimethyl-co-2,3,6-trimethyl-1,4-phenylene ether) can be substituted. Also, the compositions may contain fillers and/or reinforcing agents. It is therefore, to be understood that changes may be made in the embodiments of the invention described which are within the full intended scope of the invention as defined by the appended claims.

We claim:

1. A flame retardant composition which does not discolor on molding, comprising a polyphenylene ether resin and a flame retardant amount of a stable brominated-phenoxy alkane and a boron containing ester.

2. A flame retardant composition as defined in claim 1, which contains from about 10 to about 25 parts by weight of the boron containing salt or ester and the brominated-phenoxy alkane combined per 100 parts of the polyphenylene ether resin.

3. A flame retardant composition as defined in claim 1, in which the brominated-phenoxy alkane is 1,2-bis(-tribromophenoxy)ethane.

4. A flame retardant composition as defined in claim 1, in which the boron containing ester is tri(2-phenylcyclohexyl)borate.

5. A flame retardant composition as defined in claim 1, which also contains an effective amount of a ferrocene to enhance the flame retardance.

6. A flame retardant polyphenylene ether resin composition as defined in claim 1, wherein the polyphenylene ether is of the formula:

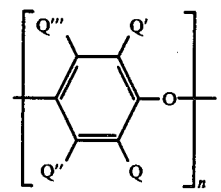

where Q, Q', Q" and Q''' are independently selected from the group consisting of hydrogen, halogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atoms and phenyl nucleus, and Q', Q" and Q''' in addition may be halogen with the proviso that Q and Q' are preferably free of a tertiary carbon atom; and n represents the total number of monomer units and is an integer of at least 50.

7. A flame retardant polyphenylene ether resin composition as defined in claim 6, wherein the polyphenylene ether resin is a poly(2,6-dialkyl-1,4-phenylene)ether.

8. A flame retardant polyphenylene ether resin composition as defined in claim 6, wherein the polyphenylene ether resin is poly(2,6-dimethyl-1,4-phenylene)ether.

9. A flame retardant polyphenylene ether resin composition as defined in claim 1, wherein the polyphenylene ether resin is in admixture with a polystyrene.

10. A flame retardant polyphenylene ether resin composition as defined in claim 1, which includes a filler or a reinforcement.

11. A molded composition free from discoloration obtained by molding the composition defined in claim 1.

12. A molded composition free from discoloration obtained by molding the composition defined in claim 8.

13. A molded composition free from discoloration obtained by molding the composition as defined in claim 9.

14. A process for preparing the composition described in claim 1 which comprises intimately mixing the polyphenylene ether resin with the flame retardant combination and blending the mixture.

15. A process as defined in claim 14 wherein the blended product is molded into any desired shape.

16. A process as defined in claim 14, in which the blend also contains a filler or a reinforcement.

17. A flame retardant composition, which comprises a polyphenylene ether resin and a flame retardant amount of a combination of 1,2-bis(tribromophenoxy)ethane and tri(2-phenylcyclohexyl)borate.

18. A composition according to claim 17, in which the polyphenylene ether resin is poly(2,6-dimethyl-1,4-phenylene)ether.

19. A molded composition free from discoloration obtained by molding the composition of claim 17.

20. A flame retardant composition, which comprises a polyphenylene ether resin and a flame retardant amount of a combination of hexabromobiphenyl and tri(2-phenylcyclohexyl) borate.

21. A composition according to claim 20, in which the polyphenylene ether resin is poly(2,6-dimethyl-1,4-phenylene)ether.

22. A molded composition free from discoloration obtained by molding the composition of claim 20.

* * * * *